(12) United States Patent
Aaron

(10) Patent No.: US 7,877,795 B2
(45) Date of Patent: Jan. 25, 2011

(54) METHODS, SYSTEMS, AND COMPUTER PROGRAM PRODUCTS FOR AUTOMATICALLY CONFIGURING FIREWALLS

(75) Inventor: Jeffrey Aaron, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 1122 days.

(21) Appl. No.: 11/589,628

(22) Filed: Oct. 30, 2006

(65) Prior Publication Data

US 2008/0148381 A1 Jun. 19, 2008

(51) Int. Cl.
G06F 9/00 (2006.01)
(52) U.S. Cl. .................................................. 726/11
(58) Field of Classification Search ............. 726/11, 726/3, 22; 713/165; 709/220, 221, 223, 709/238
See application file for complete search history.

(56) References Cited

U.S. PATENT DOCUMENTS

| 7,331,060 B1 * | 2/2008 | Ricciulli | 726/22 |
| 2003/0079146 A1 * | 4/2003 | Burstein | 713/201 |
| 2007/0204338 A1 * | 8/2007 | Aiello et al. | 726/11 |

* cited by examiner

Primary Examiner—Michael Pyzocha
Assistant Examiner—Ali S Abyaneh
(74) Attorney, Agent, or Firm—Myers Bigel Sibley & Sajovec, P.A.

(57) ABSTRACT

Methods, systems, and computer program products that automatically configure firewalls are provided. An blocked attempt by a software application executing on a user device to communicate through a firewall is detected. Information about the detected communication attempt is collected. A danger level of allowing the software application to communicate through the firewall is assessed based upon the collected information. The blocking rules/policy of the firewall are automatically modified to allow the software application to communicate through the firewall if the assessed danger level is below a threshold level.

15 Claims, 2 Drawing Sheets

METHODS, SYSTEMS, AND COMPUTER PROGRAM PRODUCTS FOR AUTOMATICALLY CONFIGURING FIREWALLS

FIELD OF THE INVENTION

The present invention relates generally to networks and, more particularly, to firewalls.

BACKGROUND OF THE INVENTION

Conventionally, firewalls are located at network gateway servers and consist of one or more programs configured to protect the resources of a network from users outside the network. For example, an enterprise with an intranet that allows its workers access to the Internet may utilize a firewall to prevent outsiders from accessing data resources on the intranet and for controlling what Internet resources enterprise users have access to. Conventionally, a firewall examines each network packet to determine whether to forward the packet to its destination. For mobile users, firewalls may be configured to allow remote access to a private network via secure logon procedures and authentication certificates, etc. Firewalls may alternately or additionally be located directly on end user devices such as computing devices, cell phones and other wireless devices, etc.

By blocking unauthorized communications into and out of a network, firewalls protect against hackers who may try and compromise network security by installing unauthorized applications on one or more network devices. These unauthorized applications may allow a hacker to obtain private and/or sensitive information from one or more network devices (e.g., passwords, credit card numbers, social security numbers, web sites visited, etc.). Although effective in thwarting hackers, firewalls can present problems to legitimate network users by blocking communications of authorized applications. Often, a firewall expert is required to configure a firewall to explicitly allow authorized applications to communicate through a firewall.

Accordingly, there is a need to automatically un-block authorized applications and allow them to communicate through firewalls without requiring time consuming and expensive assistance from technical experts.

SUMMARY OF THE INVENTION

Embodiments of the present invention provide methods, systems, and computer program products that automatically detect a software application blocking occurrence by a firewall, gather relevant information, determine if the blocking is warranted, optionally request input from a user to be considered in the determination process, and then to appropriately modify the blocking rules (i.e., policy) of the firewall if the blocking is not warranted. Thus, if a user so desires, he/she can be given more visibility into what software applications are being blocked by a firewall, along with relevant descriptive information and information regarding potential consequences of un-blocking communications for a particular application. Moreover, even if the user does not wish to be bothered, particular unwarranted blockings can be automatically corrected, such that they no longer occur.

According to some embodiments of the present invention, a method of automatically configuring a firewall (i.e., modifying the blocking rules/policies of the firewall) includes detecting an attempt by a software application executing on a user device to communicate through the firewall, wherein the firewall has blocked the communication attempt, collecting information about the detected communication attempt, and then assessing a danger level of allowing the software application to communicate through the firewall based upon the collected information. If the assessed danger level is below a threshold level, the blocking rules/policy of the firewall are automatically modified to allow the software application to communicate through the firewall. If not, the firewall continues to block the communications of the application.

Information collecting may include collecting various information including, but not limited to, N-tuple information (e.g., source and destination addresses of the communication, source and destination ports, communication protocol type and number), software application name, software application version, software application size, software application date, software application format, software application source, and logged communications between the user device and other devices. Information collecting may include monitoring communications between a user device and other devices, and may include requesting information from a user of the device.

Assessing a danger level of allowing a software application to communicate through the firewall may include comparing how similar the detected software application is to known types of dangerous applications such as viruses, spyware, malware, etc. Assessing a danger level of allowing the software application to communicate through a firewall may include comparing how similar the detected software application communication is to known software application communications, determining whether the software application is attempting to communicate sensitive and/or private data from the device, determining whether the software application is using a stealth communication method, determining whether the software application is executing at a root directory level of the device, determining whether the software application is executing at an administrator level or privileged level directory of the device, determining whether the software application is attempting to access and/or utilize sensitive memory portions of the device, determining whether the software application is attempting to access and/or utilize hard drive portions of the device including sensitive directories, determining whether the software application is attempting to execute at a highly privileged operator level of the device such as "root" or "administrator," and/or determining whether the software application is attempting to communicate with a suspicious web site. Further, in terms of identifying dangerous applications by their communications, an examination can be made of the N-tuple information (e.g., source and destination addresses of a communication, source and destination ports, communication protocol type and number), the data being carried or transported such as via a packet's data payload, and the sequence of types of communications attempted, in addition to previous communications to the network and/or other devices. These can be analyzed via rules and compared with known dangerous application communications as well as, in contrast, known safe applications. Further, heuristic rules reflecting general principles of dangerous/safe communications and specific characteristics or signatures of dangerous/safe communications can be detected and contrasted in order to help make determinations or estimations of danger or safety.

According to some embodiments of the present invention, a danger threshold level may be variable. For example, the threshold level may increase as the number of blocked software application communication attempts increases and may decrease as the number of blocked software application communication attempts decreases.

According to some embodiments of the present invention, a network service automatically configures firewalls. Upon subscribing to the network service, a user-interface agent is downloaded to the user's device and an auto-correction agent is downloaded to a firewall. The auto-correction agent is configured to detect blocked communication attempts through the firewall by software applications executing on the user device. The auto-correction agent collects various information about communication attempts blocked by the firewall and communicates this information to the network service.

According to some embodiments of the present invention, the user-interface agent is configured to request and receive input from a user about an attempted communication by a software application on the device. For example, if a user's profile indicates that the user wants to participate in decisions regarding the firewall configuration, the user-interface agent is configured to solicit information from the user. Thus, if users so desire, they can be given more visibility into what is being blocked by firewalls, and can be provided with relevant descriptive information regarding potential consequences of un-blocking particular application communications. Moreover, even if a user does not wish to be bothered, particular unwarranted blockings can be automatically corrected, such that they no longer occur.

Other methods, systems and/or computer program products according to embodiments of the invention will be or become apparent to one with skill in the art upon review of the following drawings and detailed description. It is intended that all such additional methods, systems, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

Figure 1:
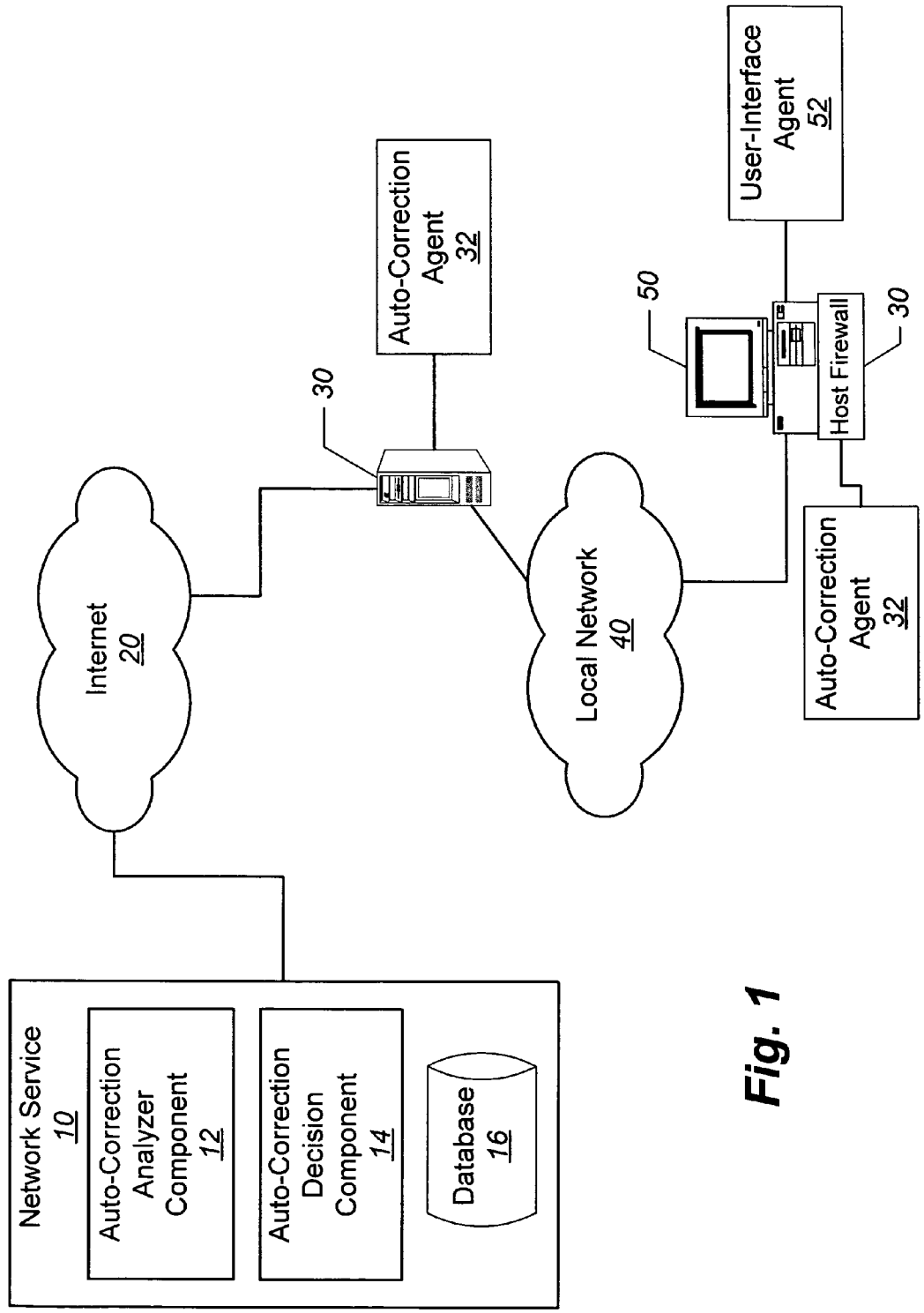
FIG. 1 is a block diagram that illustrates an exemplary network service in communication with a communication network and that is configured to automatically reconfigure a firewall, according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for automatically modifying communication blocking policies of firewalls, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The term "root level directory", as used herein, refers to the directory that includes all other directories in a computer file system that is organized as a hierarchy or tree.

The term "agent", as used herein, refers to a program (or programs) that executes on a device and that gathers information and/or performs some service, typically without requiring a user's presence or knowledge.

The term "firewall", as used herein, refers to any type of firewall including, but not limited to, "network firewalls" located at the edge of a communications network, and host firewalls located on a server and/or on a user's device such as a computing device, wireless device, etc. The location of a firewall is not intended to be limiting in any respect to embodiments of the present invention.

FIG. 1 is a block diagram that illustrates a network service 10 that is configured to automatically modify the blocking rules/policies of a firewall on a network, according to some embodiments of the present invention. The illustrated network service 10 is in communication with a network 20, such as the Internet. Although illustrated as connected to the Internet 20, the network service 10 may be connected to or accessible via various other types of networks such as intranets and other private/public communication networks. In FIG. 1, a local network 40 (e.g., an enterprise network) of computers and associated devices that share a common communications line or wireless link is also illustrated. The illustrated local network 40 includes a user device 50 connected thereto. Although illustrated as a personal computer (PC), user device 50 represents any type of device that is configured to run software applications including, but not limited to, servers, personal digital assistants (PDAs), hand-held computers, laptop computers, Internet-ready phones, etc. User device 50 may communicate directly with the local network 40 and other devices connected to the network 40 and/or may communicate wirelessly therewith.

According to some embodiments of the present invention, the user device 50 includes a user-interface agent 52 downloaded from the network service 10 and through which a user communicates with the network service 10, as will be described below. The illustrated embodiment includes a network firewall 30 and a host firewall 30. As discussed above, the term firewall as used herein includes all types of firewalls at any location. Thus, reference to firewall 30 shall include both the illustrated network firewall 30 and the host firewall 30 on a user device/server, etc.

The firewall 30 includes an auto-correction agent 32 downloaded from the network service 10 and that is configured to detect blocked communication attempts through the firewall 30 by software applications executing on user devices. The auto-correction agent 32 is configured to collect various information about communication attempts blocked by the firewall 30 and to communicate this information to the network service 10. The auto-correction agent 32 may collect various types of information including, but not limited to, N-tuple information (e.g., source and destination addresses of a communication, source and destination ports, communication protocol type and number), software application name, software application version, software application size, software application date, software application format, software application source, and logged communications between the user device 50 and other devices. (e.g., other devices in communication with the communication network 20 and/or with the local network 40), etc.

This information may be collected directly from the user device 50 and/or from other devices on the local network 40 and/or on the Internet 20. In addition, the auto-correction agent 32 may be configured to monitor communications between the user device 50 and other devices, for example, other devices connected to the local network 40, other devices connected to the Internet 20, other devices in direct communication with device 50, etc.

According to some embodiments of the present invention, if a user's profile indicates that the user wants to participate in decisions regarding the configuration of firewall 30 and/or execution of software applications on his/her device, the user-interface agent 52 is configured to solicit information from the user. For example, the user-interface agent 52 may be configured to ask a user what tasks he/she is currently performing, e.g., is the user trying to download music files from the Internet, working on a word processing document, sending an instant message, etc. The user-interface agent 52 is configured to communicate information collected from a user to the auto-correction agent 32.

However, embodiments of the present invention do not require user participation. According to some embodiments of the present invention, blocked communication attempts by software applications can be automatically monitored and the firewall 30 can be automatically reconfigured without any user involvement.

According to some embodiments of the present invention, the network service 10 includes an auto-correction analyzer component 12, an auto-correction decision component 14, and a database 16 (or access to a database 16). The database 16 contains analysis rules, analysis-relevant data and user profile data for a user of device 50. The database 16 may also be used to log information about software application communication attempts through the firewall 30.

The analyzer component 12 is configured to receive information from the auto-correction agent 32 about attempts by a software application on a user device 50 to communicate through the firewall 30 and to analyze the information and assess the danger level of the detected communication attempt. Analysis may be performed in various ways. For example, the analyzer component 12 may retrieve various rules from the database 16 and apply the collected data from the auto-correction agent 32 (and from the user-interface agent 52) to these rules. The term "rules" is intended to include, but not be limited to, "if/then" rules, algorithms, pattern matching techniques, look-ups including table look-ups, decision tree approaches and/or other processing/computational methods, etc. Some such techniques are sometimes referred to as "heuristic" when done to detect viruses for which direct-matching signatures are not yet available, and at least some of these sorts of rule-based detection are already employed in anti-virus products. Differences versus similarities to known viruses, malware, and spyware, whether with respect to their communications or other aspects, can be measured using a variety of known statistical and/or software-related and/or networking-related and/or communications-related methods. Further, some types of rules utilize conditional determinations, such as look-ups and decision trees which determine the previous and/or simultaneous presence of multiple items such as measurement results or determinations, which, taken together, can have a significant predictable effect upon the potential danger level of allowing a particular type of application and/or a particular instance of a type of application to communicate through a firewall. During analysis, it may be necessary to obtain additional information from the user device 50 and/or from a user. In this case, the network service 10 may also be configured to request additional information from the auto-correction agent 32 and/or may also be configured to request additional information from the user via the user-interface agent 52.

In some instances, the analyzer component 12 may be able to identify whether it is clearly okay to allow a software application to communicate through the firewall 30 without requiring a detailed analysis. For example, for certain users in a department of a company, it may be clear that execution of a particular software application is okay and, conversely, it may be clear that execution of a particular software application is not okay. For example, the analyzer component 12 may determine that other users on the local network 40 are authorized to allow a software application to execute on their devices and to communicate through the firewall 30. Similarly, there may be instances where the analyzer component 12 will clearly know that a software application should not execute and should not communicate through the firewall 30 without requiring a detailed analysis.

The analyzer component 12 is configured to notify the auto-correction agent 52 to modify the blocking rules/policies of the firewall 30 (i.e., to "configure" the firewall) to allow a software application to communicate through the firewall 30 when it is clearly okay to do so, and without any input from the user. Similarly, the analyzer component 12 is configured to notify the auto-correction agent 52 to direct the firewall 30 to continue blocking communication attempts by a software application when it is clearly not okay for a software application to communicate through the firewall 30.

According to some embodiments of the present invention, the analyzer component 12 can become "smart" over time and can direct the auto-correction agent 32 to modify the blocking rules/policies of the firewall 30 to let an application communicate through the firewall 30 because the analyzer component 12 has seen the particular application or type of application before and knows that it is okay to allow it to communicate through the firewall.

According to some embodiments of the present invention, the analyzer component 12 is configured to assess a danger level of a software application for which communications have been blocked and assign a score to the software application that corresponds to the assessed danger level (e.g., a danger scale may be from 1 (safe) to 10 (dangerous)). The analyzer component 12 may be configured to assess a danger level of a software application by, for example, comparing how similar the detected software application is to one or more of the following known types of dangerous applications: viruses, spyware, malware, etc. In addition, the analyzer component 12 may be configured to assess a danger level of the detected software application by determining one or more of the following: whether the software application is attempting to access/communicate sensitive and/or private data on the user device 50, whether the software application is using a stealth communication method to communicate through the firewall 30, whether the software application is executing at a root directory level of the device 50, whether the software application is executing at an administrator level or privileged level directory of the device 50, whether the software application is attempting to access and/or utilize sensitive memory portions of the device 50, whether the software application is attempting to access and/or utilize hard drive portions of the device 50, including sensitive directories, whether the software application is attempting to execute at a highly privileged operator level of the device 50 such as "root" or "administrator," and/or whether the device 50 has previously communicated with a suspicious web site. The size of the executing software application also may be indicative of whether the application is dangerous or not. For example, if a software application is much larger than it should be for the function it is supposed to provide, this may be an indication that the application is dangerous (e.g., it may be spyware, etc.).

In terms of identifying dangerous applications by their communications, an examination can be made of the N-tuple information, the data being carried or transported such as via a packet's data payload, and the sequence of types of communications attempted, in addition to previous communications to the network and/or other devices. These can be analyzed via rules and compared with known dangerous application communications as well as, in contrast, known safe applications. Further, heuristic rules reflecting general principles of dangerous/safe communications and specific characteristics or signatures of dangerous/safe communications can be detected and contrasted in order to help make determinations or estimations of danger or safety.

The illustrated network service 10 includes an auto-correction decision component 14 that receives from the analyzer component 12 an assessed danger level for a software application attempting to communicate through the firewall 30 and then makes a decision whether or not to reconfigure the firewall to allow the software application to communicate through the firewall 30. For example, a danger level threshold may be established above which an application is not allowed to communicate through the firewall 30. For example, if a danger level threshold of 5 is established, the communication of any software applications with a danger level of 5 or below will be allowed and the communication of any software applications with a danger level greater than 5 will not be allowed. As another example, the decision component 14 may allow the firewall 30 to continue to block communications of a software application if a danger level is 8 or above, and may configure the firewall to allow the software application to communicate through the firewall 30 if the danger level is 3 or below. However, if the danger level is between, for example, 4 and 7, the network service 10 may ask the user for input (assuming the user has indicated he/she wants to provide input). A danger level threshold may be established using various parameters and need not be the same for all software applications.

The decision component 14 may also be configured to retrieve user profile data and, if appropriate, request input from a user of the device 50 about a software application. The decision component 14 is configured to use received user input along with an assessed danger level to make a decision whether to allow a software application to communicate through the firewall 30 or whether to continue to allow the firewall 30 to block communications. The decision component 14 is configured to communicate its decision to the auto-correction agent 32 at the firewall 30. The decision component 14 also is configured to communicate and with the user-interface agent 52 at the user device 50 when additional information is needed from a user.

The auto-correction agent 32 implements the decision of the decision component 14, i.e., the auto-correction agent 32 either modifies the blocking rules of the firewall 30 or continues to allow the firewall to block communications attempts by the software application. In addition, the auto-correction agent 32 may be configured to log the decision whether to reconfigure the firewall 30 to allow a software application to communicate through the firewall 30 or to allow the firewall to continue blocking communication attempts by the software application. The network service 10 may also be configured to log the decision whether to allow a software application to communicate through the firewall 30 or to allow the firewall to continue blocking communication attempts by the software application, for example, within the database 16.

Embodiments of the present invention are not limited to the above-delineated configurations of the network service 10, auto-correction agent 32, and user-interface agent 52. One or more of the above-described tasks may be performed by one or more of the network service 10, auto-correction agent 32, and user-interface agent 52. For example, the auto-correction agent 32, or a user device itself, may be configured to detect a communication attempt by a software application on the device, block the communication attempt, collect information about the software application (including information from a user), analyze the collected information to determine a danger level, and either configure the firewall 30 or allow the firewall 30 to continue blocking communication attempts by a software application.

Exemplary operations for automatically configuring a firewall to allow a software application to communicate through the firewall, according to some embodiments of the present invention, will now be described with reference to FIG. 2. Initially, a blocked communication attempt through a firewall by a software application executing on a user device is detected (Block 100). Information about the detected communication attempt is collected (Block 110). As described above, collecting information may include monitoring communications between the device and other devices. Collecting information may also include collecting one or more of the following types of information: source and destination addresses of a communication, source and destination ports, communication protocol type and number, software application name, software application version, software application size, software application date, software application format, software application source, and logged communications between the user device and other devices, etc. Collecting information may include collecting information from a user of the device if the user so desires (Block 120).

Using the collected information, the danger level of allowing the software application to communicate through the firewall is assessed (Block 130). As described above, assessing a danger level of a software application communication may include comparing how similar the detected software application is to a virus, to spyware, and/or to malware. Assessing a danger level of the detected software application communication attempt may also include determining whether the software application is attempting to access/communicate sensitive and/or private data on the device, whether the software application is using a stealth communication method to communicate through the firewall, whether the software application is executing at a root directory level of the device, whether the software application is executing at an administrator level or privileged level directory of the device, and/or whether the device has previously communicated with a suspicious web site on the Internet, etc. If the danger level of the software application that attempted to communicate through the firewall exceeds a threshold level (Block 140), the firewall blocking rules are not modified and the firewall continues to block communication attempts by the application (Block 150). If the danger level of the software application that attempted to communicate through the firewall does not exceed a threshold level (Block 140), the firewall blocking rules are modified and the software application is allowed to communicate through the firewall (Block 160).

Figure 2:
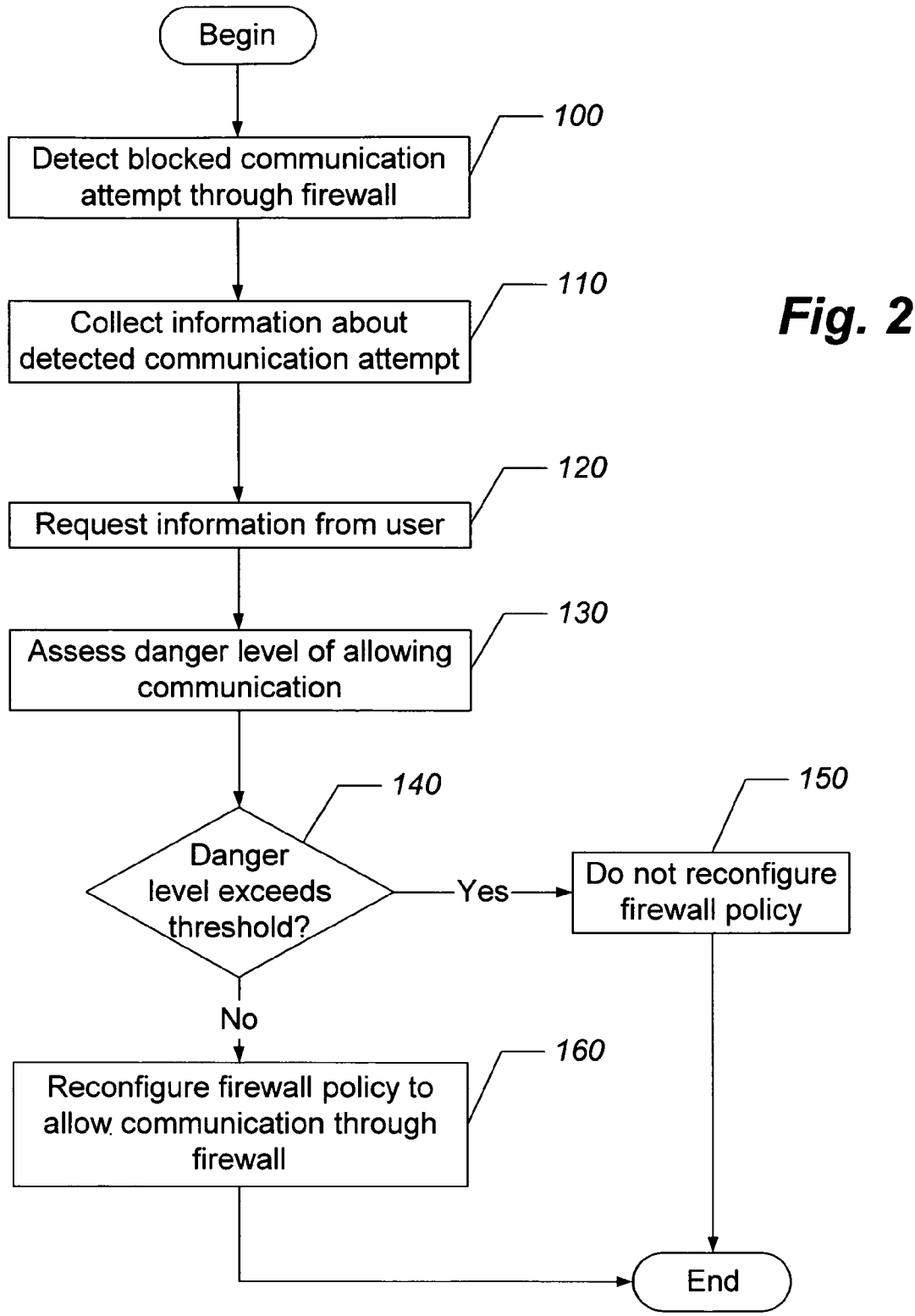
FIG. 2 is a flow chart that illustrates exemplary operations for configuring a firewall, according to some embodiments of the present invention.

FIGS. 1-2 illustrate the architecture, functionality, and operations of some embodiments of methods, systems, and computer program products for automatically configuring blocking rules of firewalls. In this regard, each block represents a module, segment, or portion of code, which comprises one or more executable instructions for implementing the specified logical function(s). It should also be noted that in other implementations, the function(s) noted in the blocks may occur out of the order noted in FIG. 2. For example, two blocks shown in succession may, in fact, be executed substantially concurrently or the blocks may sometimes be executed in the reverse order, depending on the functionality involved.

Example

Amy is attempting to use a new instant messenger application on her PC (e.g., device 50, FIG. 1) and has previously subscribed to a security anti-blocking service (i.e., network service 10, FIG. 1) offered by her Internet provider which installed software from its web site onto Amy's PC (i.e., user-interface agent 52, FIG. 1) and onto the firewall 30 (i.e., auto-correction agent 32, FIG. 1) of the local network 40 to which Amy's PC is connected. The firewall's current policy rules do not address the new instant messenger application, so its communications are blocked by the firewall. Amy notices that her firewall blocks the application's communications (since she has configured her firewall to notify her of any "outgoing" connection attempts initiated from her PC that it blocks). Alternatively, Amy may not have configured her firewall to notify her of any "outgoing" connection attempts initiated from her PC that it blocks, and she just notices that her instant messenger program does not initially seem to be working, or that there is a noticeable delay.

The firewall auto-correction agent 32 collects information relevant to the communication attempt/blocking event. The firewall auto-correction agent 32 sends the relevant information to the auto-correction analyzer component 12 of the Network Service 10. The analyzer component 12 applies rules and utilizes the information to assess the danger level of allowing the instant messenger application to communicate through the firewall 30. Assuming score ranges of 0 (most dangerous) to 100 (safest), the analyzer component 12 assesses three pertinent scores: first, an interim "intrinsic safety" score of 78 (probably safe, e.g., not usually affecting sensitive data, operations, or usage), a "well-known?" score of 83 (fairly widespread blockbuster application, with well understood behavior and characteristics), and a "vulnerable to hacking?" score of 33 (hacker exploitation potential, e.g., uses communication protocols and/or methods that can theoretically be hacked, but requiring considerable difficulty).

The analyzer component 12 informs the auto-correction decision component 14 of the interim scores and the decision component applies additional rules to process in some cases average or sum these scores, depending on whether the scores exceed various thresholds, and then accesses Amy's profile (which she previously configured using the auto-correction service web site, and from which she downloaded the auto-correction agent 32 and user-interface agent 52) to determine that Amy wants to be consulted whenever danger level scores less than 55 are encountered. The decision component 14 sends an input request to the user-interface agent 52 on Amy's PC. The input request is displayed at Amy's PC as a pop up and informs Amy that the interim hacker vulnerability score is a fairly low 33 and that it appears an instant messenger application is trying to communicate through the firewall. Since she knows this is probably safe since she is currently trying to use the instant messenger application at this time, and thus the activity is probably due to her rather than a hacker, and moreover she knows the application she is trying to use is from a relatively trusted source, Amy indicates that it is okay for the application to proceed with communicating through the firewall 30, for example, by clicking a button on the pop up.

Upon receiving Amy's "okay", the decision component 14 notifies the auto-correction firewall agent 32 to allow the application to communicate through the firewall 30. The auto-correction agent 32 configures the firewall (i.e., modifies blocking rules/policies) such that the instant messenger application is no longer blocked, and logs this.

Some spy-ware bundled with the instant messenger application then attempts to communicate through the firewall 30. The auto-correction agent 32 collects this information and forwards to the analyzer component 12 which is able to easily match to known spyware. The decision component 14 instructs the auto-correction agent 32 that its blocking of communication by this spy-ware is correct (i.e., no need to modify the firewall rules) without even bothering Amy to provide any input Many variations and modifications can be made to the preferred embodiments without substantially departing from the principles of the present invention. All such variations and modifications are intended to be included herein within the scope of the present invention, as set forth in the following claims.

That which is claimed:

1. A method of automatically configuring a firewall, the method comprising:
    automatically detecting an attempt by a software application executing on a user device to communicate through the firewall, wherein the firewall has blocked the communication attempt;
    automatically collecting information about the attempt detected;
    automatically assessing a danger level of allowing the software application to communicate through the firewall based upon the information collected, comprising determining at least one of the following: whether the software application is attempting to communicate sensitive and private data from the user device, whether the software application is using a stealth communication method, whether the software application is executing at a root directory level of the user device, whether the software application is executing at an administrator level directory of the user device, whether the software application is attempting to access sensitive memory portions of the user device, whether the software application is attempting to access hard drive portions of the user device including sensitive directories, whether the software application is attempting to execute at a highly privileged operator level of the user device, and whether the software application is attempting to communicate with a suspicious web site; and
    automatically reconfiguring the firewall to allow the software application to communicate through the firewall if the assessed danger level is below a threshold danger level, wherein the threshold danger level is variable and further comprising increasing the threshold danger level as a number of blocked software application communication attempts increases, and decreasing the threshold danger level as the number of blocked software application communication attempts decreases.

2. The method of claim 1, wherein collecting information comprises collecting at least one of the following types of information: source and destination addresses of the communication, source and destination ports, communication protocol type and number, software application name, software application version, software application size, software application date, software application format, software application source, and logged communications between the user device and other devices.

3. The method of claim 1, wherein collecting information comprises determining whether the software application is an authorized software application for the user device.

4. The method of claim 1, further comprising requesting information about the software application from a user of the device.

5. The method of claim 4, wherein prior to requesting information from the user, reviewing a profile of the user to determine if the user wants to provide input on firewall configurations.

6. The method of claim 1, wherein assessing a danger level of allowing the software application to communicate through the firewall comprises comparing how similar the detected software application is to at least one of the following known types of dangerous applications: viruses, spyware, malware.

7. The method of claim 1, wherein assessing a danger level of allowing the software application to communicate through the firewall comprises comparing how similar the detected software application communication is to known software application communications.

8. The method of claim 1, wherein assessing a danger level of allowing the software application to communicate through the firewall comprises examining at least one of the following: N-tuple information, data being carried or transported, sequence of types of communications attempted, and previous communications to the network and other devices.

9. A system that automatically configures a firewall, comprising:
    a processor;
    memory coupled to the processor; and
    a computer program code residing in the memory that, when executed by the processor, causes the processor to perform the following:

automatically detect an attempt by a software application executing on a user device to communicate through the firewall, wherein the firewall has blocked the communication attempt;

automatically collect information about the attempt detected;

automatically assess a danger level of allowing the software application to communicate through the firewall based upon the information collected based on at least one of the following: whether the software application is attempting to communicate sensitive and private data from the user device, whether the software application is using a stealth communication method, whether the software application is executing at a root directory level of the user device, whether the software application is executing at an administrator level directory of the user device, whether the software application is attempting to access sensitive memory portions of the user device, whether the software application is attempting to access hard drive portions of the user device including sensitive directories, whether the software application is attempting to execute at a highly privileged operator level of the user device such as root, and whether the software application is attempting to communicate with a suspicious web site; and automatically reconfigure the firewall to allow the software application to communicate through the firewall if the assessed danger level is below a threshold danger level, wherein the threshold danger level is variable and wherein the processor is configured to increase the threshold danger level as a number of blocked software application communication attempts increases, and decrease the threshold danger level as the number of blocked software application communication attempts decreases.

10. The system of claim 9, wherein the processor collects at least one of the following types of information: source and destination addresses of the communication, source and destination ports, and communication protocol type and number, software application name, software application version, software application size, software application date, software application format, software application source, logged communications between the user device and other devices, data being carried or transported, sequence of types of communications attempted, and previous communications to the network and other devices.

11. The system of claim 9, wherein the processor determines whether the software application is an authorized software application for the user device.

12. The system of claim 9, wherein the processor requests information about the software application from a user of the device.

13. The system of claim 12, wherein the processor reviews a profile of the user to determine if the user wants to provide input on firewall configurations.

14. The system of claim 9, wherein the processor assesses a danger level of allowing the software application to communicate through the firewall by comparing how similar the detected software application is to at least one of the following known types of dangerous applications: viruses, spyware, malware.

15. The system of claim 9, wherein the processor compares how similar the detected software application communication is to known software application communications.

* * * * *